March 16, 1937.  H. W. SWIFT  2,074,078
METHOD OF AUTOMATIC TENSION CONTROL IN BELT AND ROPE DRIVES
Filed June 12, 1936  2 Sheets-Sheet 1
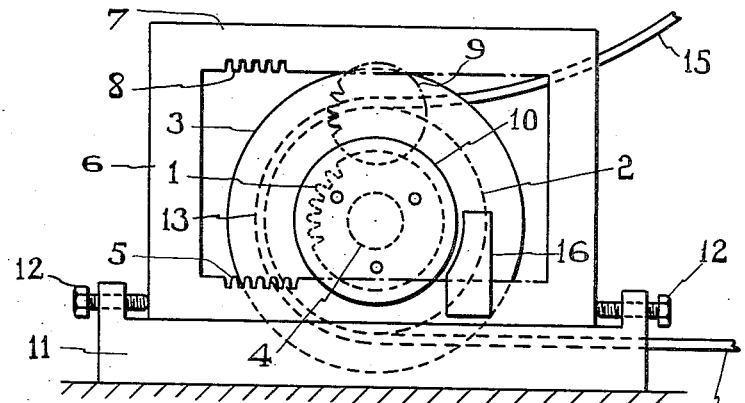
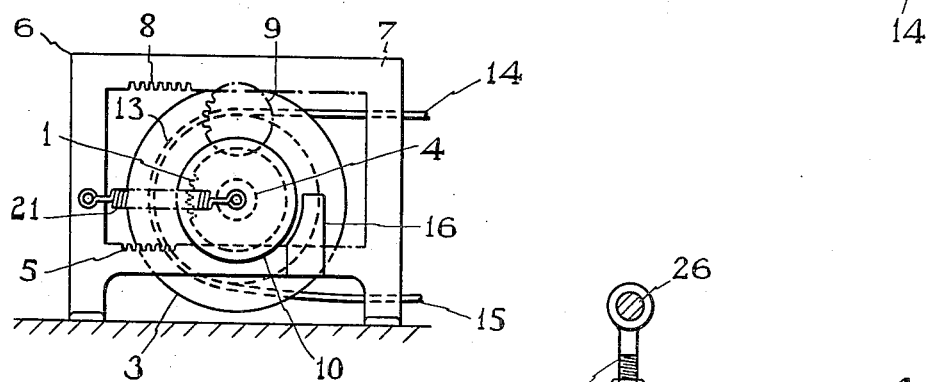
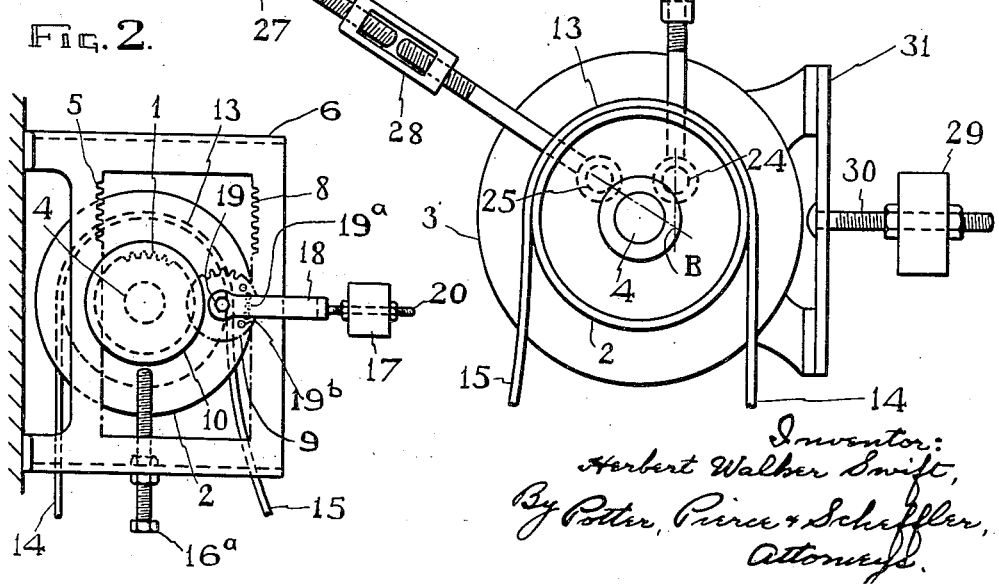
Inventor:
Herbert Walker Swift,
By Potter, Pierce & Scheffler,
Attorneys.

March 16, 1937. H. W. SWIFT 2,074,078
METHOD OF AUTOMATIC TENSION CONTROL IN BELT AND ROPE DRIVES
Filed June 12, 1936 2 Sheets-Sheet 2
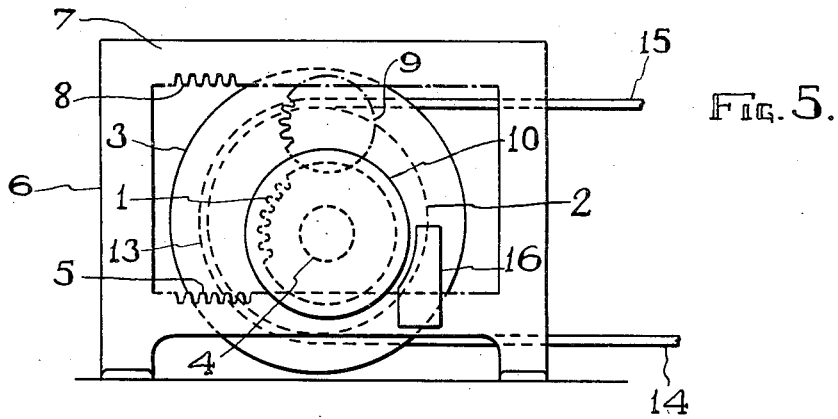
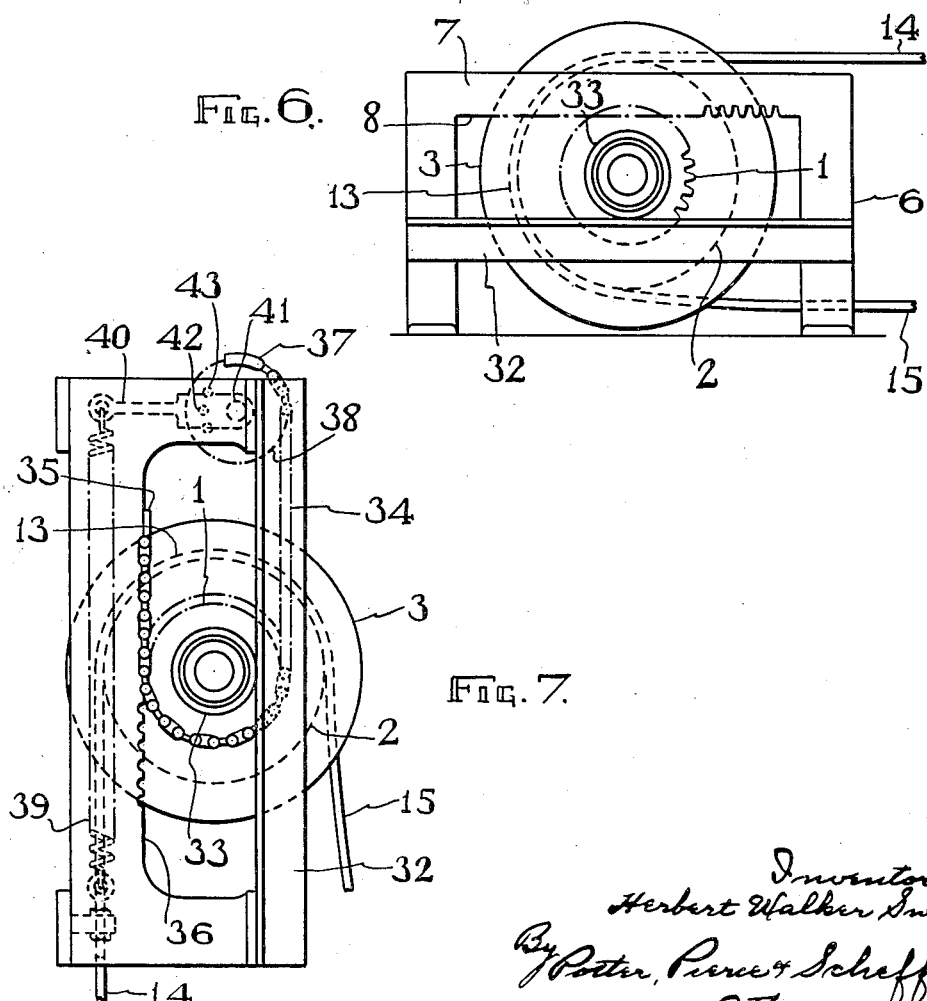

Patented Mar. 16, 1937

2,074,078

UNITED STATES PATENT OFFICE 2,074,078

METHOD OF AUTOMATIC TENSION CONTROL IN BELT AND ROPE DRIVES

Herbert Walker Swift, Shipley, England

Application June 12, 1936, Serial No. 84,950
In Great Britain November 19, 1934

9 Claims. (Cl. 74—242.13)

This invention relates to an automatic tension control in belt and rope drives by means of a pulley mounted on a unit in which the torque is wholly or mainly transferred through a usually stationary part mounted in such a way that it is capable of rotating to some extent about an axis parallel and eccentric to the axis of the pulley.

The object of the present invention is to adapt a device of this kind for automatically varying the tension in the drive as the torque varies or as the belt or ropes stretch, in such a way that the ratio between the tensions in the tight and slack strands of the drive is maintained within controllable limits.

If a unit is free to rotate without constraint about a pivotal axis and is so balanced that its weight acts through this axis it will automatically be oriented by the tension in the strands of the belt in such a way that the resultant tension passes through the pivotal axis since the only external effective forces acting on the unit are the belt tension and the reaction through the pivotal axis. Hence the belt will become tighter or slacker until the ratio between the tensions in the tight and slack strands of the belt is equal to the ratio between the perpendicular distances of the pivotal axis from the slack and tight strands respectively. This action will take place irrespective of changes in the length of the belt due to elastic or permanent stretch or other causes, so long as the unit is free to rotate. When the linkage which determines the pivotal axis is so arranged that the position of this axis relative to the strands of the belt changes as the unit rotates the value of the tension ratio will undergo corresponding changes but will nevertheless be controlled by the pivotal arrangement.

If the weight of the unit does not pass through the pivotal axis, or if constraints such as springs are applied to provide initial tension or for other purposes, the ratio between the tensions in the tight and slack strands of the belt will be modified according to the turning moment which these constraints exert about the pivotal axis and will depend jointly upon this turning moment and upon the power transmitted by the drive. By the provision of counterweights or springs in suitable positions it is easy to predetermine the range of value of the tension ratio within any desired limits.

The term torque transmitting or torque receiving element hereinafter employed is to be construed as including pulleys, armature shafts, crank shafts or any like power transmitting or receiving elements. The term torque reaction member is to be construed as including electric motors or any driving or driven machine in which the torque reaction from a belt or rope drive is transferred to the usually stationary part of the machine.

It will be understood that the invention may be carried into effect in several ways, and by way of example several embodiments will be described with reference to the figures of the accompanying drawings.

Fig. 1 is a side elevation of one end of a substantially horizontal motor drive constructed according to this invention;

Fig. 2 is a side elevation drawn to a reduced scale of a similar construction to Fig. 1 adapted for a vertical motor drive;

Fig. 3 is a side elevation drawn to a reduced scale of a similar construction to Fig. 1 with the tight strand of the belt at the top and initial belt tensioning means;

Fig. 4 is a side elevation of a modified construction for a vertical drive with the motor carried by suspensory linkage;

Fig. 5 is a side elevation similar to Fig. 1 but with the toothed wheels fixed eccentric to the centre of gravity of the motor;

Fig. 6 is a side elevation similar to Fig. 1 but with the toothed wheels engaging upper racks and supported on guides;

Fig. 7 is a side elevation showing a vertical drive with the toothed wheels engaging chains.

Referring to Fig. 1 a pair of similar toothed wheels 1 less in diameter than the motor pulley 2 are made fast one to each end plate of the motor 3 in a position concentric with the axis of the rotor shaft 4 and mesh with a pair of supporting racks 5 which carry the weight of the motor. Each rack 5 may conveniently form part of a frame 6 on the underside of whose upper member 7 is a rack 8 parallel to the supporting rack 5. Enmeshed with each toothed wheel 1 and upper rack 8 is an idle toothed wheel 9, and the number of teeth on the wheels 1 and 9 and the height of the frames 6 are so chosen as to allow a slight working clearance between the teeth on the racks 8 and idlers 9. Each toothed wheel 9 is located axially on one side by the end plate of the motor 3 and on the other by a shroud plate 10 fixed to the outer face of the corresponding wheel 1. Each of the frames 6 is adjustably mounted on a pedestal 11 provided with short adjusting screws 12 at each end for positioning the frame 6.

With this construction it will be understood that the instantaneous pivotal axis of the motor casing is the line joining the points of contact for the time being between the wheels 1 and racks 5 and that under the moment caused by the transmitted torque the motor casing tends to roll back along the racks 5 in a predetermined course, the instantaneous axis thereby forming an automatically movable axis, thus tightening the belt 13 until rotational equilibrium is attained when the resultant of the tensions in the two strands 14, 15 of the belt 13 passes through the instantaneous pivotal axis. When this condition is attained the tension ratio of the drive is $$\frac{R+r}{R-r}$$

where R is the pulley radius and $r$ the pitch radius of the wheels 1.

In this construction if the racks 5 are horizontal and the centre of gravity of the motor 3 lies, as is usual, approximately on the centre line of the wheels 1, the weight of the motor will have no appreciable influence on the pivotal rotation. The initial tension and maximum tension in the belt 13 can be controlled by adjustable stops 16 attached to the racks 5. The adjustment provided by the screws 12 will only be required to ensure true alignment of the belt drive and may if so desired be dispensed with together with the pedestals 11; belt stretch is accommodated by the racks 5.

With the above construction the idle toothed wheels 9 engage the guide rails 7 to keep the toothed wheels 1 enmeshed with the racks 5 and will frequently be unnecessary, but if the drive were such that the tight strand lay above, then the frames 6 with wheels and motor could be completely inverted on the pedestals 11, in which case the weight of the motor would be carried through the wheels 9, but the pivotal axis of the motor casing would be the line joining the points of contact between the wheels 1 and the racks 5 (now positioned above the wheels 1) and the automatic tensioning property would be identically preserved.

In the modified arrangement shown in Fig. 2, the aforesaid construction is adapted for a vertical drive by turning the frames 6 on their ends and providing an adjustable counterweight 17 for balancing the weight of the motor 3 through the toothed wheels 1 and 9 and affording adjustment for initial tension and tension ratio. One side arm of a member 18 is secured to each of the toothed wheels 9 by means of a set screw 19 and, to prevent accidental movement of the member about the screws, each arm is furnished with an inwardly projecting pin 19a located in one of a series of holes 19b formed in the adjacent wheel 9. The counterweight 17 is mounted adjustably on a rod 20 projecting from the member 18 and the turning moment it exerts about the points of contact for the time being between the wheels 9 and guide racks 8 retains the motor 3 in the desired position. When the member 18 assumes an angular position due to upward movement of the wheel 9, the effective turning moment of the weight 17 is reduced, but may be recovered by releasing the screws 19 for disengaging the pins 19a and raising the member to a horizontal position where it is again secured by entering the pins into other holes 19b and tightening the screws 19.

Alternatively, the counterweight may be replaced by a spring or springs anchored to the member 18 and the frame 6 or the wheels 9 may be suspended on springs. The adjustable stop 16a in Fig. 2 comprises a long set screw passed through the frame 6 and held in an adjusted position by lock nuts.

In cases where it is desired to reduce the mean tension of the drive as the transmitted torque increases in order to ensure slip at some specified value of this torque, the construction shown in Fig. 3 may be employed. As shown, the tight strand 14 of the belt 13 is at the top and initial tensioning means are provided in the form of a spring 21 at each end of the motor 3 for drawing the pulley 2 into the loop of the belt. If desired the tension of each spring may be made adjustable by the provision of an adjustable anchorage at one end.

In Fig. 4 is shown a further modified construction for a vertical drive from a motor 3 to a machine below. Two pairs of rods 22, 23 are attached at one end to pivots 24, 25 on the end plates of the motor 3 and at the other end to pivots 26, 27 which are usually fixed. Means of adjustment for setting and alignment are provided by turn-buckles 28 in any or all of the rods 22, 23 and means of adjustment for initial tension and tension ratio by a counterweight 29 carried adjustably on a rod 30 made fast to a plate 31 bolted across the feet of the motor 3.

In this construction the suspensory linkage is so disposed that the points of intersection B of the rods 22 and 23 which determine the instantaneous pivotal axis lie between the pulley axis and the tight part 14 of the belt 13 over the useful range of displacement. For this reason it is found convenient to dispose the suspensory linkage in such a way that the rods 22 on the side adjacent to the tight part 14 of the belt 13 are approximately vertical, while the other rods 23 are oblique after the manner indicated in Fig. 4.

If it is desired to make use of the weight of the motor 3, as for example to produce initial tension in the belt 13, the construction shown in Fig. 5 can be adopted with the wheels 1 fixed to the end plates of the motor 3 at a suitable eccentricity from the centre of gravity of the latter.

In Fig. 6 the motor 3 is shown controlled by upper racks 8 and supported by guide rails 32 upon which idlers in the form of ball or roller bearings 33 are adapted to rest. The rails 32 and bearings 33 retain the gear wheels 1 in mesh with the racks 8 and the motor is free to roll back along the rails under the moment caused by transmitted torque.

Fig. 7 illustrates a construction for a vertical drive wherein the toothed wheels 1 mesh with roller chains 34 which are anchored at one end 35 to the racks 36 (cut to suit and support the roller chain) and at the other end 37 to a take-up pinion 38. The bearings 33 and guide rails 32 cause the chains 34 to engage jointly with the toothed wheels 1 and racks 36 and each chain is taken-up on its pinion 38 by a spring 39 and a lever 40 pivoted about the axis 41 of the pinion. The lever 40 is adjustably anchored to the pinion by the pin 42 entering one of the holes 43.

Torque reaction causes the motor 3 to roll up the chain 34 for tightening the belt 13 until rotational equilibrium is attained.

What I claim is:—

1. Automatic tension control means for belt or rope drives comprising a torque transmitting or receiving element including a pulley, a torque reaction member carrying said element, and a mounting for said torque reaction member; said mounting including stationary racks, gears in mesh with said racks and fixed to the torque reaction member with their centers on a line parallel to a line parallel to the axis of said element, parallel guide racks spaced from the first mentioned racks, and idler gears carried by the torque reaction member and meshing respectively with said first mentioned gears and said guide racks, said idler gears retaining the first mentioned gears in engagement with said stationary racks, whereby said torque reaction member may be displaced along said stationary racks in accordance with the torque reaction to vary the tension in the belt or rope drive.

2. Automatic tension control means for belt or rope drives comprising a torque transmitting or receiving element including a pulley, a torque reaction member carrying the said element, a mounting for the said reaction member including pairs of spaced vertically disposed racks, gears fixed to the torque reaction member with their centres on a line parallel to a line parallel to the axis of the said element, said gears meshing with one pair of the said rack, and intermediate idler gears disposed between and meshing with the first-mentioned gears and the other pair of racks.

3. Automatic tension control means according to claim 2, wherein lever means are arranged to modify the effective weight of the said reaction member and the said element.

4. Automatic tension control means according to claim 2, wherein a counterweight and lever means are arranged to modify the weight of the said reaction member and the said element and the lever means is connected to and acts through the said intermediate idler gear wheels.

5. Automatic tension control means for belt or rope drives comprising a torque transmitting or receiving element including a pulley, a torque reaction member carrying the said element, and a mounting for the said torque reaction member including chains, and gears in mesh with the said chains and fixed to the torque reaction member with their centres on the axis of the said element, said gears engaging the said chains so that angular displacement of the torque reaction member under the influence of torque reaction causes bodily movement of the torque reaction member for varying the tension in a belt or rope engaging the said pulley.

6. Automatic tension control means for belt or rope drives comprising a torque transmitting or receiving element including a pulley, a torque reaction member carrying the said element, and a mounting for the said torque reaction member, said mounting comprising pairs of links pivoted to the torque reaction member and to fixed points arranged so that the longitudinal axes of the links intersect at a point between the rotational axis of the said element and the tight run of the belt or rope.

7. Automatic tension control means according to claim 6, wherein the pairs of links pivoted to the torque reaction member and to fixed points are adjustable in length.

8. Automatic tension control means according to claim 6, wherein an adjustable counterweight is connected to the said torque reaction member to modify its weight.

9. Automatic tension control means for belt or rope drives comprising a torque transmitting or receiving element including a pulley, a torque reaction member carrying the said element, a flexible drive member in engagement with said pulley, means adjustable to establish an initial tension in said flexible drive member, and means for controlling said torque reaction member, such last mentioned means including movable elements which under the influence of torque reaction on the member cause the latter to rotate to some extent about a virtual axis parallel to the axis of the said element and eccentric to it by an amount not exceeding the radius of the pulley in order to vary the tension in a belt or rope engaging the said pulley.

HERBERT WALKER SWIFT.